(12) United States Patent
Daffron

(10) Patent No.: US 8,429,379 B2
(45) Date of Patent: *Apr. 23, 2013

(54) RECONFIGURABLE MICROPROCESSOR CONFIGURED WITH MULTIPLE CACHES AND CONFIGURED WITH PERSISTENT FINITE STATE MACHINES FROM PRE-COMPILED MACHINE CODE INSTRUCTION SEQUENCES

(76) Inventor: Christopher J. Daffron, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/205,252

(22) Filed: Aug. 8, 2011

(65) Prior Publication Data

US 2011/0296141 A1  Dec. 1, 2011

Related U.S. Application Data

(63) Continuation of application No. 10/248,785, filed on Feb. 18, 2003, now Pat. No. 8,024,548.

(51) Int. Cl.
*G06F 15/76* (2006.01)
*G06F 9/00* (2006.01)

(52) U.S. Cl.
USPC .......................................................... 712/15

(58) Field of Classification Search ........................ None
See application file for complete search history.

(56) References Cited

U.S. PATENT DOCUMENTS 6,289,440 B1 *  9/2001  Casselman .................... 712/227
7,114,062 B2     9/2006  Johnson
2008/0028186 A1  1/2008  Casselman
2008/0028187 A1  1/2008  Casselman et al.

OTHER PUBLICATIONS

M.B. Gokhale, A. Kopser, S.P. Lucas, R.G. Minnich, "The Logic Description Generator", IEEE, Jun. 1990, pp. 111-120, Proceedings of the Application Specific Array Processors, Jul. 1990, DOI: 10.1109/ASAP.1990.145448. Originally filed by Applicant on May 11, 2006.
William I. Fletcher, An Engineering Approach to Digital Design, 1980, pp. 226, 231, 240,241, Prentice-Hall, Englewood Cliffs, New Jersey, U.SA. ISBN 0-13-277699.5.
Tanenbaum, "Structured Computer Organization", 2nd Edition, 1984, pp. 10-11.

* cited by examiner

*Primary Examiner* — David J Huisman
(74) *Attorney, Agent, or Firm* — Snell & Wilmer L.L.P.

(57) ABSTRACT

A processor, integrated with re-configurable logic and memory elements, is disclosed which is to be used as part of a shared memory, multiprocessor computer system. The invention utilizes the re-configurable elements to construct persistent finite state machines based on information decoded by the invention from sequences of CISC or RISC type processor machine instructions residing in memory. The invention implements the same algorithm represented by the sequence of encoded instructions, but executes the algorithm consuming significantly fewer clock cycles than would be consumed by the processor originally targeted to execute the sequence of encoded instructions.

5 Claims, 1 Drawing Sheet

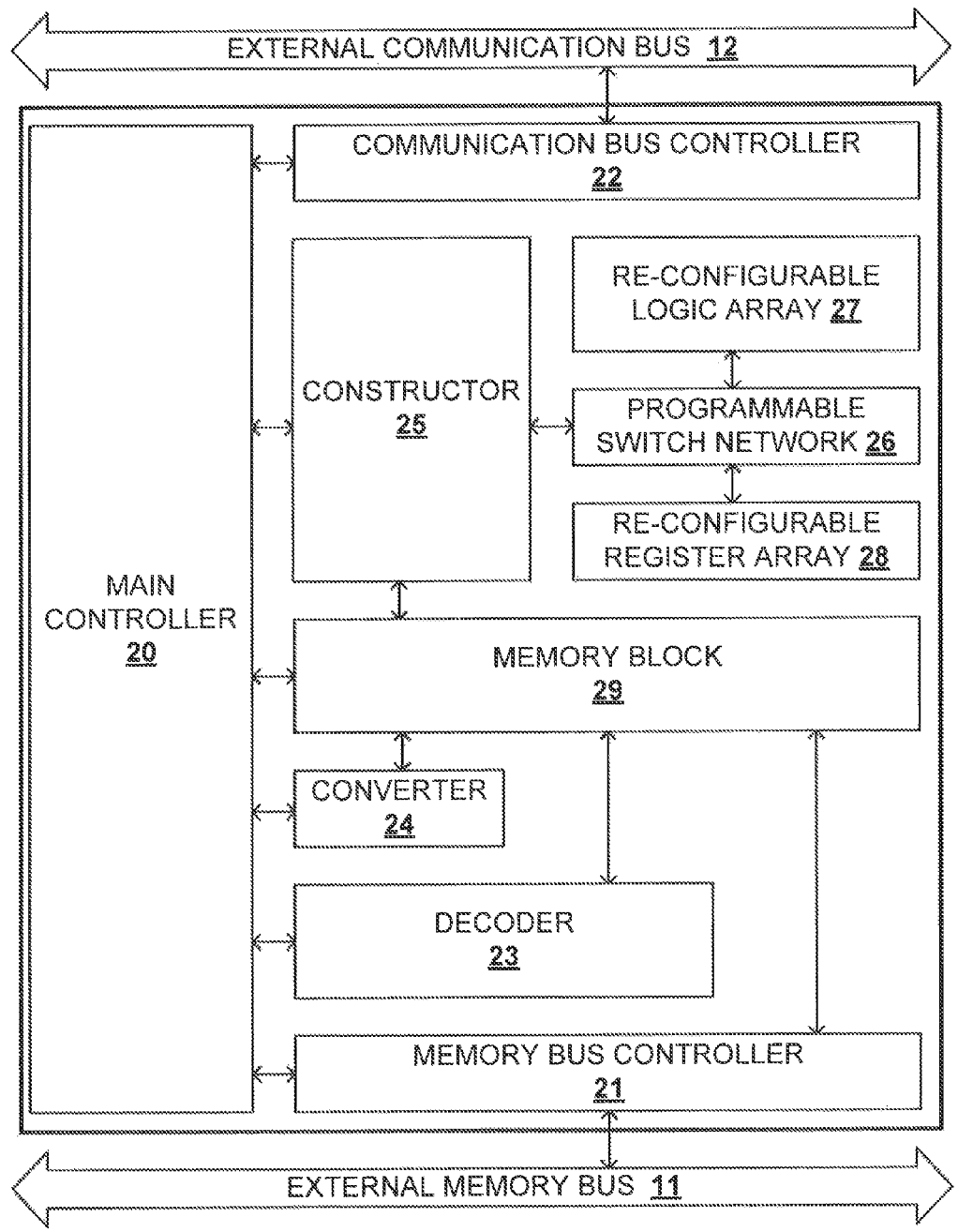

RECONFIGURABLE MICROPROCESSOR CONFIGURED WITH MULTIPLE CACHES AND CONFIGURED WITH PERSISTENT FINITE STATE MACHINES FROM PRE-COMPILED MACHINE CODE INSTRUCTION SEQUENCES

CROSS REFERENCE TO RELATED APPLICATIONS

This application is a continuation of U.S. patent application Ser. No. 10/248,785 filed on Feb. 18, 2003, now U.S. Pat. No. 8,024,548 entitled "INTEGRATED CIRCUIT MICROPROCESSOR THAT CONSTRUCTS, AT RUN TIME, INTEGRATED RECONFIGURABLE LOGIC INTO PERSISTENT FINITE STATE MACHINES FROM PRE-COMPILED MACHINE CODE INSTRUCTION SEQUENCES." The entire contents of the foregoing application are hereby incorporated by reference.

BACKGROUND

A typical multiprocessing computer system consists of operating system software residing in main memory running on at least one of two or more microprocessors executing code in parallel that share both a common memory access bus as well as an inter-processor communication bus.

Two types of microprocessors are commonly used to implement a multiprocessing computer system: Complex Instruction Set Computer (CISC) processors or Reduced Instruction Set Computer (RISC) processors. Both types of processors operate by fetching native machine instructions from memory, decoding them, and then executing those instructions in sequential order. Each step in the process of completing an instruction consumes clock cycles. The same cumulative number of clock cycles will be consumed each time the same sequence of instructions is completed.

Virtually any computer algorithm can be implemented through the correct sequencing of instructions which are encoded in the native machine language of the particular CISC or RISC processor targeted to execute that sequence. This sequence of encoded instructions residing in memory is essentially a representation of the algorithm itself. Therefore, any type of processor having access to the block of memory containing the instruction sequence, and having the capability of decoding the sequence, can potentially implement the algorithm even though it may not have been the original processor targeted to execute the sequence.

Alternatively, a computer algorithm can be implemented by constructing a finite state machine through the correct configuration of one or more re-configurable logic devices. A well known example of a re-configurable logic device is a Field Programmable Gate Array (FPGA). A typical re-configurable logic device contains an array of both simple and complex logic elements, as well as, registers. The configuration information is stored in memory in the form of an encoded bit map. This bit map residing in memory essentially represents the finite state machine and therefore the algorithm itself.

A re-configurable logic device only has to fetch and decode the configuration bit map once to construct any finite state machine whose existence will persist until re-programmed. For a given algorithm, a finite state machine typically requires significantly fewer clock cycles to execute as compared to a microprocessor executing a sequence of instructions. The ability of a re-configurable logic device to implement computer algorithms depends on the variety, complexity and quantity of logic elements available to configure.

SUMMARY

The present invention discloses a processor which constructs and executes persistent finite state machines using sequences of machine instructions, residing in shared memory, which represent computer algorithms originally targeted to be executed by either a CISC or RISC type microprocessor. The novel features characteristic of the present invention allow for the execution of computer algorithms consuming significantly fewer clock cycles than would be required by a CISC or RISC type processor sequentially executing those same computer algorithms encoded in their own native machine language.

BRIEF DESCRIPTION OF THE DRAWINGS

The novel features believed characteristic of the invention are set forth in the appended claims. The invention itself will be best understood by reference to the following description and accompanying drawing wherein:

The FIGURE is a functional block diagram of a processor in accordance with the preferred embodiment of the present invention.

DETAILED DESCRIPTION

The preferred embodiment of the present invention is best understood by referring to the FIGURE.

The FIGURE illustrates the basic functional block diagram of a processor in accordance with the preferred embodiment of the present invention. The processor is comprised of ten separate functional circuit blocks which operate together to enable the processor to construct persistent finite state machines capable of executing computer algorithms that were originally encoded as a sequence of machine instructions native to a CISC or RISC type microprocessor.

The components necessary to build finite state machines are contained within the re-configurable logic array 27, the re-configurable register array 28, and the programmable switch network 26. The re-configurable logic array 27 can contain a variety of individual logic elements ranging from simple combinational logic gates to more complex general logic functions such as adders or shift registers. The re-configurable register array 28 contains many memory storage elements, such as flip-flops, that can be configured to operate individually, or grouped together to work in either a serial or parallel fashion. The programmable switch network 26 is composed of a network of conductive and connective elements that have operational connections to every element contained within both the re-configurable logic array 27 and the re-configurable register array 28. This network terminates to an array of switching devices, also contained within the programmable switch network 26, which can be programmed to connect together elements within both the re-configurable logic array 27 and the re-configurable register array 28 into one or more of the available configuration combinations. Each configuration combination represents the intended behavior of an executable finite state machine whose existence will persist until the programmable switch network 26 is re-programmed.

The constructer 25 has the task of constructing executable finite state machines by programming the programmable switch network 26. The constructer 25 utilizes configuration bit maps, fetched from a memory cache contained within the memory block 29, to direct its finite state machine building tasks. A given configuration bit map represents the state of one or more switching devices that are contained within the programmable switch network 26. The constructer 25 is also responsible for relaying data between the finite state machines and the memory block 29.

The decoder 23 is specifically designed to decode sequences of machine instructions native to either a specific Complex Instruction Set Computer (CISC) microprocessor or a Reduced Instruction Set Computer (RISC) microprocessor. The decoder 23 requires knowledge of the encoded instruction set for a particular CISC or RISC type processor in order to correctly decode a sequence of machine instructions originally targeted to be executed by that processor. The decoder 23 fetches the sequence of machine instructions from a memory cache contained within the memory block 29. The decoder 23 has the ability to re-order a decoded instruction sequence, as well as, parsing it into smaller sequences that are readily translatable into finite state machines. The decoder 23 then stores the decoded and parsed sequences of instructions into a different memory cache also contained within the memory block 29.

The converter 24 has the task of converting the decoded and parsed sequences of instructions, fetched from a memory cache contained within the memory block 29, into configuration bit maps that the constructer 25 can use to construct finite state machines. The converter 24 then stores the configuration bit maps into a different memory cache also contained within the memory block 29.

The memory block 29 contains an array of both volatile and non-volatile types of memory devices organized into separate groups. Portions of the memory contained within the memory block 29 are in the form of caches, and are directly accessible by a majority of the processor's functional circuit blocks.

The memory bus controller 21 interfaces with an external memory bus 11 by which the processor accesses externally shared memory. The memory bus controller 21 is a bus mastering agent designed with both the operational connections, as well as, the necessary protocols compatible with a specific bus design enabling it to correctly carry out transactions on the external memory bus 11. Having access to the externally shared memory, the memory bus controller 21 can fetch sequences of machine instructions and store them into a memory cache contained within the memory block 29. The memory bus controller 21 is also used to relay other forms of data between the memory block 29 and externally shared memory such as data produced by any finite state machine.

The communication bus controller 22 interfaces with an external communication bus 12 by which the processor can communicate with the other external processors having access to the same external communication bus 12. The communication bus controller 22 is designed with both the operational connections, as well as, the necessary protocols compatible with a specific bus design enabling it to correctly carry out transactions on the external communication bus 12. An inter-processor communication bus is essential for any multiprocessing computer system. It is through the use of the communication bus controller 22 that the processor determines which sequences of machine instructions to fetch from externally shared memory that are subsequently used by the processor to construct executable finite state machines.

The main controller 20 is responsible for the over all control and coordination of the activities of all other functional circuit blocks contained within the processor. The behavior of the main controller 20 can optionally be modified by configuration data it fetches from the memory block 29 which optionally could have been originally fetched from externally shared memory by the memory bus controller 21.

What is claimed is:

1. A microprocessor, comprising:
an array of re-configurable gate logic circuits;
an array of re-configurable register logic circuits;
a programmable switch network having operational connections to the elements of both the array of re-configurable gate logic circuits and the array of re-configurable register logic circuits;
a memory circuit block comprising a plurality of cache memory circuits and a plurality of non-volatile memory circuits;
a binary code decoder circuit block that performs, at run time, decoding, re-ordering, and parsing of sequences of binary encoded Complex instruction Set Computer (CISC) type or Reduced Instruction Set Computer (RISC) type machine code instructions into newly generated sequences of binary code which are then stored in a first cache memory of the memory circuit block;
a binary code converter circuit block that converts, at run time, the newly generated sequences of binary code into newly generated configuration bit map codes which are then stored in a second cache memory of the memory circuit block;
a constructer circuit block that configures, at rain time, the array of re-configurable gate logic circuits and the array of re-configurable register logic circuits into at least one finite state machine through the use of the newly generated configuration bit map codes; and
a memory bus controller circuit block that interfaces with an external memory bus compatible with a multiprocessor computer system, the external memory bus operable to fetch the sequences of binary encoded CISC type or RISC type machine code instructions stored in an externally shared memory and to store the sequences of binary encoded CISC type or RISC type machine code instructions in a third cache memory of the memory circuit block.

2. The microprocessor of claim 1, wherein the sequences of binary encoded CISC type or RISC type machine code instructions represent particular computer algorithms.

3. The microprocessor of claim 1, further comprising an inter-processor communication bus controller circuit block that interfaces with an external inter-processor communication bus compatible with the multiprocessor computer system, the external inter processor communication bus operable to communicate with other processors that are also interfaced with the external inter-processor communication bus.

4. The microprocessor of claim 3, further comprising a main controller circuit block that controls the operation of the memory circuit block, the binary code decoder circuit block, the binary code converter circuit block, the constructor circuit block, the memory bus controller circuit block, and the inter-processor communication bus controller circuit block.

5. A method for configuring finite state machines on a microprocessor, the method comprising:
decoding, re-ordering, and parsing, at run time, via a binary code decoder circuit block, sequences of binary encoded Complex Instruction Set Computer (CISC) type or Reduced Instruction Set Computer (RISC) type machine code instructions into newly generated sequences of binary code, wherein the newly generated sequences of binary code are stored in a first cache memory of a memory circuit block on the microprocessor;

converting, at run time, via a binary code converter circuit block, the newly generated sequences of binary code into newly generated configuration bit map codes, wherein the newly generated configuration bit map codes are stored in a second cache memory of the memory circuit block;

interfacing, by a memory bus controller circuit block, with an external memory bus compatible with a multiprocessor computer system to fetch the sequences of binary encoded CISC type or RISC type machine code instructions from an externally shared memory, wherein the sequences of binary encoded CISC type or RISC type machine code instructions are stored in a third cache memory of the memory circuit block; and configuring, at run time, via a constructer circuit block, an array of re-configurable gate logic circuits and an array of re-configurable register logic circuits into at least one finite state machine through the use of the newly generated configuration bit map codes.

\* \* \* \* \*